United States Patent
Brattain et al.

(10) Patent No.: US 7,328,186 B2
(45) Date of Patent: Feb. 5, 2008

(54) CLIENT ACCOUNT AND INFORMATION MANAGEMENT SYSTEM AND METHOD

(75) Inventors: Joseph Samuel Brattain, Austin, TX (US); Enrique Rodriguez, New Fairfield, CT (US); Terry Varon Washington, Silver Spring, MD (US); Sandra Sue Shore, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 1490 days.

(21) Appl. No.: 09/735,444

(22) Filed: Dec. 12, 2000

(65) Prior Publication Data

US 2002/0073011 A1    Jun. 13, 2002

(51) Int. Cl.
*G06Q 40/00* (2006.01)
(52) U.S. Cl. .................. 705/37; 705/10; 705/26; 707/1; 707/10; 707/100; 707/523; 709/201
(58) Field of Classification Search .................. 705/10, 705/14, 35–40, 26; 707/1, 100; 709/201
See application file for complete search history.

(56) References Cited

U.S. PATENT DOCUMENTS

| | | | | |
|---|---|---|---|---|
| 5,862,223 A | | 1/1999 | Walker et al. ................ 380/25 |
| 5,875,437 A | * | 2/1999 | Atkins .......................... 705/40 |
| 5,892,900 A | * | 4/1999 | Ginter et al. ................ 713/200 |
| 5,987,454 A | * | 11/1999 | Hobbs ............................ 707/4 |
| 6,038,545 A | * | 3/2000 | Mandeberg et al. .......... 705/15 |
| 6,122,625 A | | 9/2000 | Rosen .......................... 705/65 |
| 6,343,275 B1 | * | 1/2002 | Wong ........................... 705/26 |
| 6,807,558 B1 | * | 10/2004 | Hassett et al. .............. 709/203 |

* cited by examiner

*Primary Examiner*—Hani M. Kazimi
*Assistant Examiner*—Olabode Akintola
(74) *Attorney, Agent, or Firm*—Robert H. Frantz; David A. Mims, Jr.

(57) ABSTRACT

An information repository and management system for data regarding a client base which integrates a plurality of information types including database records, word processor files, e-mail, other hyperlinked documents, web pages and web sites. Implemented as a database application on a web-enabled database server, sales and marketing team members may access the system through an intranet or remotely through an Internet. Portions of the database may be extracted and placed on a portable computing device for traveling purposes. The extracted database can be later synchronized with the central database upon return of a sales and marketing team member from a meeting or business trip. Links and expandable subforms are provided to web sites for stock quoting and client home pages, allowing sales team members to quickly gather information regarding a company's latest news announcements, stock performance, and financial status. Client relationship documents, such as meeting summaries, previous meeting briefing packages, and action item tracking sheets are organized and accessible through the system.

7 Claims, 5 Drawing Sheets

CLIENT ACCOUNT AND INFORMATION MANAGEMENT SYSTEM AND METHOD

BACKGROUND OF THE INVENTION

1. Field of the Invention

This invention relates to the arts of database applications, information management, and report preparation, and especially to the arts of preparation and summarization of client-related information for sales and marketing organizations.

2. Description of the Related Art

Most companies, especially large corporations, have a structure of senior vice presidents who are in charge of maintaining relationships with the company's clients. Each senior vice president may be responsible for a wide variety of client accounts representing large and small companies from diverse industries.

Reporting to each senior vice-president is typically a group of account executives and administrative or executive assistants. This group, as a whole, including the senior vice-president or the manager of the group and the account executives, is often referred to as an "executive group." Although different companies may adopt different titles for these positions, the structure and responsibilities for each position are similar from company to company in most cases.

The executive group is responsible for meeting with the company's largest or most significant clients to establish and maintain working relationships with those clients. The goal of these meetings and relationships is ultimately to sell the company's products to the clients, to inform the clients of advantages of the company's products and services, and to collect information necessary to identify potential new products and services which the clients may need or want.

In order to properly demonstrate to a client that a company's products or services fit the client's needs, the executive group must understand the financial status, commercial challenges, and competitive position of the client in the client's marketplace. Typically, this "background" information is collected during an initial meeting during which members from an executive group establish a new relationship with a new client. During a series of subsequent "follow up" meetings intended to maintain that relationship, the flow of information continues from the company to the client, and vice versa.

In preparation for these initial and follow-up meetings, the executive group staff often creates client profiles and briefing packages for the senior vice-president and account executives so that those persons will have the appropriate data and information with which to address each client's specific needs.

For example, it may be important for the executive team to understand the finacial status of the client, such as recent stock price changes or recent investment announcements, in order to properly consider and prepare the presentation for the client. It may also be useful for the executive team to review the biographies of the client's executives and points of contact, and to review previous notes and action items from previous meetings. This may allow the executive team to provide consistency from one meeting to another, which may be separated in time by several weeks or even several months. An additional challenge to providing consistency and continuity in the discussions between the company and the client is that often times not all of the same attendees are present at all of the meetings. The representatives for the client, such as purchasing managers, may find it frustrating to hold a follow-up meeting with a supplier's sales staff in which new staff are present and who are not familiar with where the previous meeting and discussions concluded.

Following these meetings, there are typically issues to be addressed. These issues and "action items" may affect many groups of the company, such as the sales department, the manufacturing department, shipping, and engineering groups. Thus, the action items and issues must be disseminated within the company's organization, and must be managed or surveyed for results. In typical organizations, the executive staff members maintain these lists of action items, issues and notes from previous meetings in their personal computers, such as in their own e-mail files and word processor files. This storage scheme poses a problem when an executive team is preparing for an upcoming meeting and the individual possessing the lists is not available. If that executive team who possesses the information is not available, such as that staff member is on a trip or out of office, it may be difficult for the other team members to find and access that information on the possessor's computer. This problem is further exasperated by the fact that most executive sales team members use "laptop" portable computers, so their information repository may actually travel with them and may not be physically available to the other team members at the sales and marketing offices.

Many senior executives in the executive group have learned through years of experience that having comprehensive briefing packages to review prior to a client meeting is crucial to the success of the meetings with clients. Therefore, they often task executive assistants and account executives with preparing full and complete briefing packages prior to the actual meetings with the clients.

While this approach of delegation relieves the senior executive team member of the effort necessary to collect all of that information from the various repositories where it may be stored, it does create additional work and tasks for the executive assistants and the junior members of the executive team. Further, the team may not be able to physically access all of the information which is required, resulting in gaps or holes within the briefing package which is submitted to the senior executive member.

Therefore, there is a need in the art for a system and method which provides a centralized repository for client information such that all team members of an executive group may quickly and conveniently access that information, if they are authorized to do so. Additionally, there is a need in the art for this system and method to be accessible remotely, as an executive member may travel from one client site to another client site without visiting a home office in the interim.

Further, there is a need in the art for this centralized client information repository to be able to integrate and store a plurality of forms of data, such as word processor documents, presentation documents, web based documents, electronic mail, and database records.

Additionally, there is a need in the art for this system to allow for extraction or export of partial databases to be downloaded to portable computers, and to allow for the re-integration of new information in these partial databases into the centralized database, otherwise known as "synchronization" of databases.

BRIEF DESCRIPTION OF THE DRAWINGS

The following detailed description, when taken in conjunction with the figures presented herein, provide a complete disclosure of the invention.

SUMMARY OF THE INVENTION

The system provides an information repository for data regarding a company's client base. It integrates a plurality of information types including database records, word processor files, e-mail, and hyperlink documents such as web pages and web sites. The system is implemented as a database application on a web-enabled database server such that sales and marketing team members may access the system through an intranet or remotely through an Internet.

The system is also designed such that portions of the database may be extracted and placed on a portable device, such as a lap top computer or personal digital assistant, for traveling purposes. One advantage of the system includes the ability to synchronize the extracted database with the central database upon return of a sales and marketing team member from a meeting or business trip.

The system further provides links to web sites, such as stock quoting web sites and client's home pages, allowing a sales team member to use the system to quickly gather information regarding a company's latest news announcements, stock performance, and financial status.

The system organizes the users into groups so that a group member may only access information which is relevant to the clients assigned to his or her group. The system also allows for the organization of related documents, such as meeting summaries, previous meeting briefing packages, and action item tracking sheets, and it is capable of receiving input via e-mail in order to capture information which is communicated within the company and between the client and the company via e-mail.

DETAILED DESCRIPTION OF THE INVENTION

The foregoing and other objects, features, and advantages of the invention will be apparent from the following, more particular description of a preferred embodiment of the invention, as illustrated in the accompanying drawings, wherein like reference numbers represent like parts of the invention.

Figure 1:
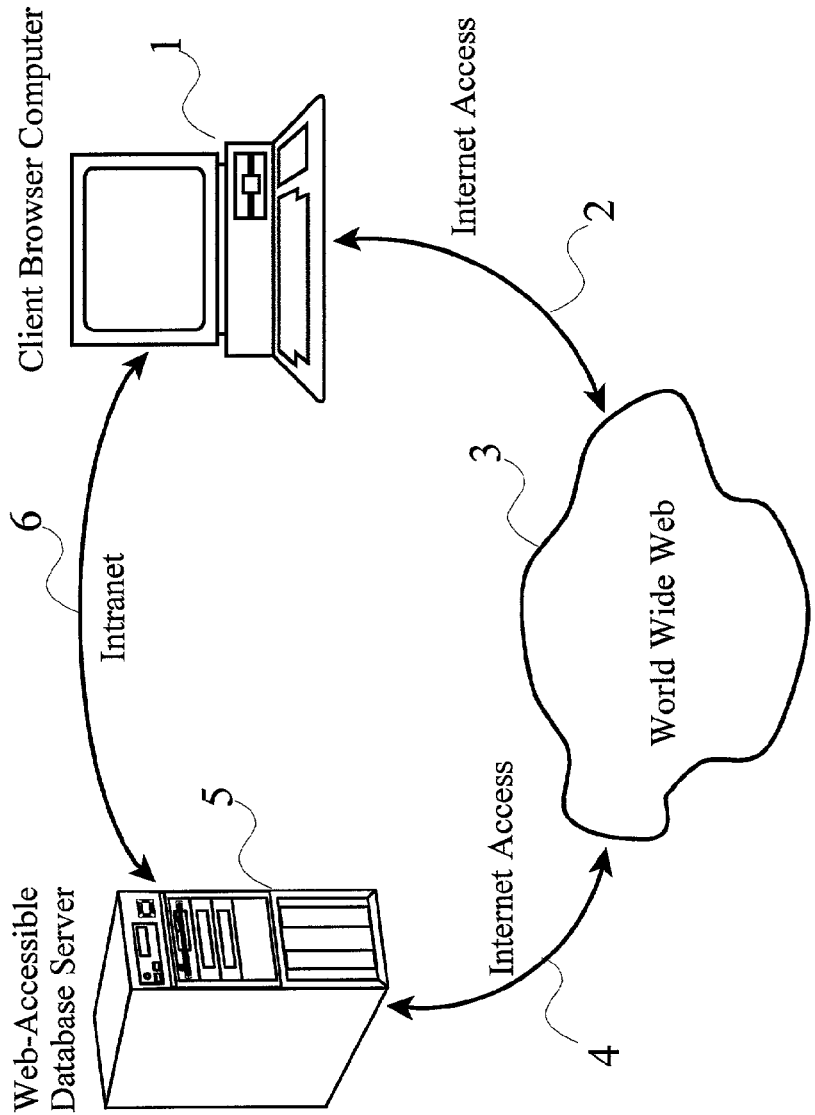
FIG. 1 illustrates the typical arrangement of browser computers with a web-accessible database server via an intranet or via the Internet.

The invention is preferably realized as a database application in a web-accessible database server. Turning to FIG. 1, a common arrangement of a web-accessible database server (5) is shown with a browser computer (1). The web-accessible database server (5) may be one of many types, such as an Oracle server, or such as an IBM Lotus Notes server, as in the preferred embodiment. The client browser computer (1) may be a personal computer equipped with web browser software such as Netscape Navigator or Microsoft Explorer software products. Alternatively, the client browser computer may be a personal digital assistant device ("PDA"), or a web-enabled telephone such as a web-enabled personal communication system phone.

The web accessible database server (5) and the client browser computer (1) are communicatively inter-linked using the Internet (3), or an intranet (6), or any other suitable computer network.

Figure 2:
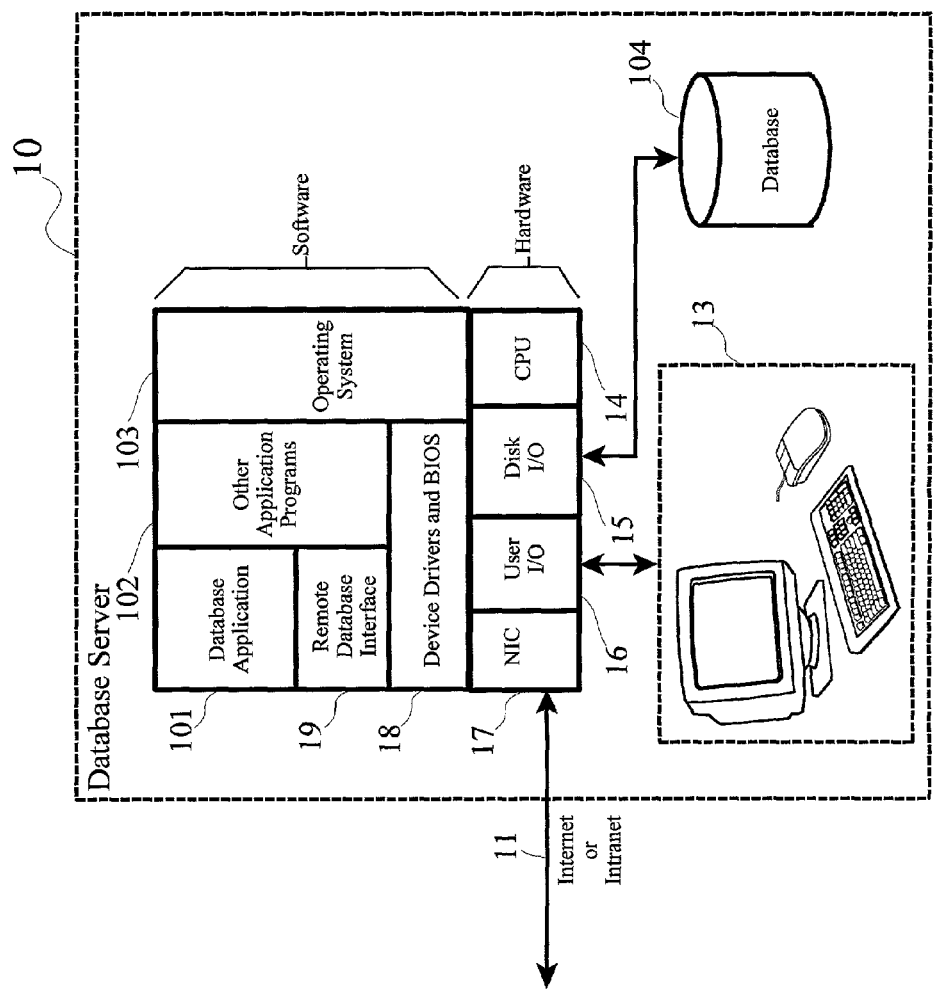
FIG. 2 shows a common configuration of a database server platform.

As shown in FIG. 2, the generalized architecture of a web-accessible database server (10) is shown. The basic hardware platform of the database server (10) consists of a group of user input/output ("I/O") devices (13) such as a computer screen or monitor, keyboard, and mouse. The hardware platform also typically includes a central processing unit ("CPU") (14), disk I/O interfaces (15), interfaces to the user interface group (16), and a computer network interface (17) such as a network interface card (17). The network interface card (17) may be a common local area network ("LAN") interface, such as an Ethernet card, a dedicated modem device such as a high speed DSL modem, or any other suitable computer network interface compatible with the selected computer platform.

The network interface device interfaces to a computer network, preferably the Internet or intranet (11). The database server (10) is also provided with a set of device drivers (18), a basic input/output services ("BIOS") function (18), and an operating system (103). The database server also includes a database application (101) program, a remote database interface communications suite (19), and a database stored either locally or remotely (104).

This generalized view of a database server which is remotely accessible over a computer network is applicable to many types of databases and especially to that of the Lotus Notes server, as used in the preferred embodiment. According to the preferred embodiment, the database server platform comprises an IBM RS/6000 computer, running the IBM AIX operating system. As the AIX operating system is a multi-tasking operation system, the database server may also execute other application programs (102) on a time-shared basis with the database application and remote database interface software. The system also is preferably equipped with the IBM Lotus Notes server product, and a suitable Hyper Text Transfer Protocol ("HTTP") communications and web-server suite.

Figure 3:
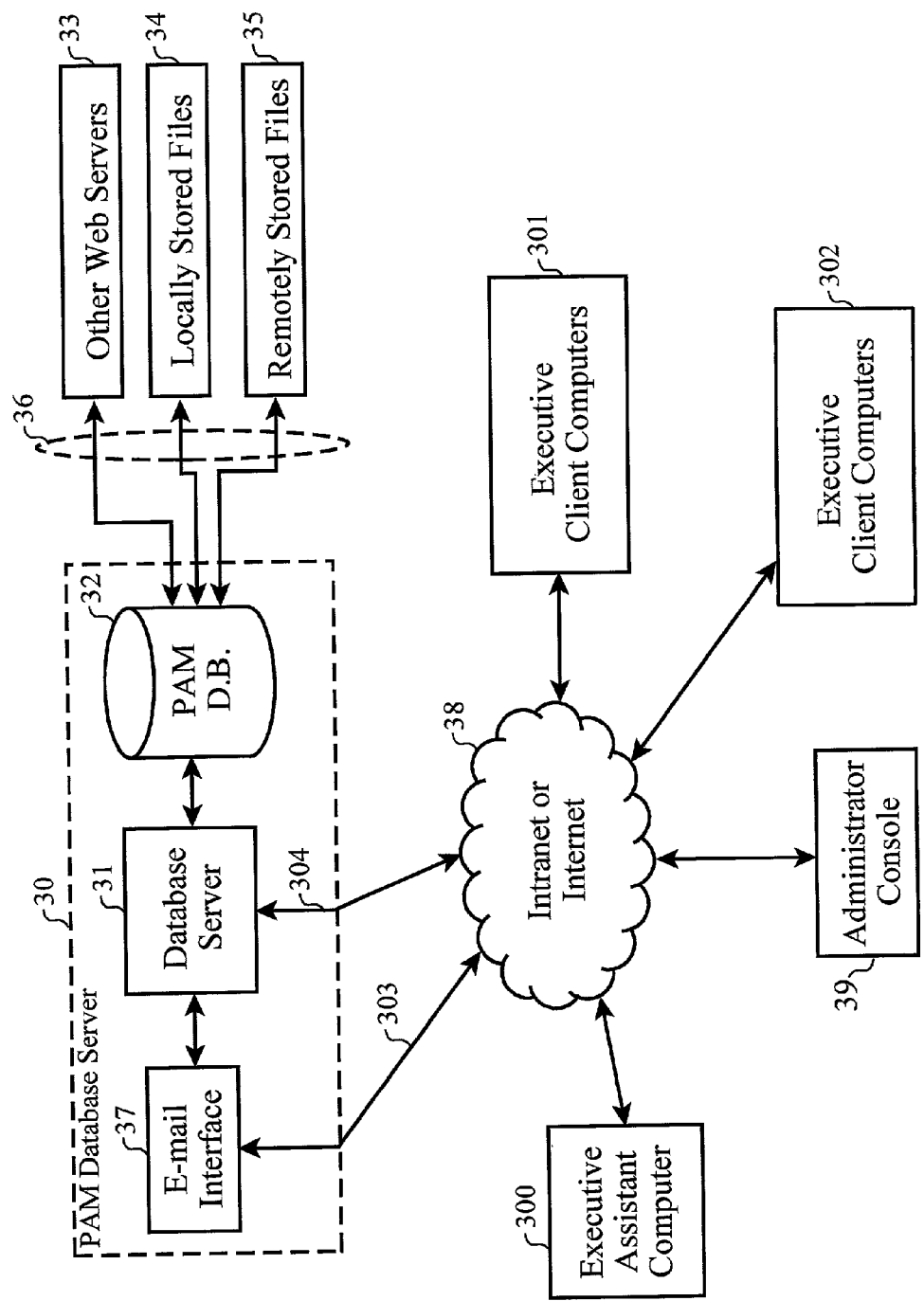
FIG. 3 illustrates the architecture of the preferred embodiment of the invention.

The organization of the database server and its remote client computers and administration console is shown in FIG. 3. The invention is referred to as the Partnership Account Management ("PAM") system. The PAM database server (30) comprises a Lotus Notes database server (31), as previously described, and a PAM database (32). Further according to the preferred embodiment, the PAM database server (30) includes an e-mail interface (37) for receiving e-mail messages and data for storage and organization in the PAM database (32).

A Lotus Notes database may incorporate a plurality of data and document types such as rich text format ("RTF") fields in the database through hyperlinks to locally and remotely stored files (34 and 35), and hyperlinks to other web servers and web addresses (33). If a user of a Lotus Notes database selects, such as "double clicking", a link to a word processor file or presentation file, the Lotus Notes program can "launch" the associated application program. For example, a hyper link to a "LWP" file, when selected, will cause the IBM Lotus Word Pro word processor application program to be launched so that the LWP file can be viewed. If a user selects a hyper link which points to a web address, such as an address for a stock quote service, the Lotus Notes program can launch an instance of a web browser program and automatically point that browser to the selected web address.

As such, hyperlinks (36) to computer files and web servers are stored directly in fields of the PAM database (32), and the user interface of Lotus Notes provides the capability for automatically instantiating web browsers, word processor, presentation programs, and e-mail readers.

The database server (31) is accessible via a corporate intranet or via the Internet (38) through common web technologies (304), such as Hyper Text Transfer Protocol ("HTTP") and Secure Hyper Text Transfer Protocol ("HTTPS"). This allows remote executive client computers (301 and 302), as well as administrator consoles (39) and computers for the executive assistants (300), to access the PAM database (32) remotely using a common web browser on their computer, such as Microsoft's Explorer or Netscape's Navigator. The capability of the Lotus Notes server to deliver user interfaces in "forms", such as HTML forms, CGI forms and Java scripts, is leveraged to allow the remote access of the PAM database via common web browser technologies on common web browser platforms. This allows any common web browsing device, including but not limited to personal computers, laptop computers, personal digital assistants, and web enabled telephones, may be used as a terminal to access the PAM database server (30) and database (32), and the linked information therein.

Additionally, an e-mail interface provided by the Lotus Notes server (31) allows for users to submit data and documents for storage in the PAM database (32) via e-mail. The database application is preferably configured to parse a field or fields in received e-mail messages directed to the database application server. For example, the SUBJECT field of an e-mail message addressed to the e-mail interface (37) may be formatted to indicate in which client account to store the contents of the e-mail, such as:

"SUBJECT:CLIENT_NAME:action_item"

or

"SUBJECT:CLIENT_NAME:sales_history".

When the e-mail interface (37) receives an e-mail, it is transferred to the database application which parses the appropriate e-mail field(s), and stores or hyperlinks the data within the PAM database (32).

Figure 4:
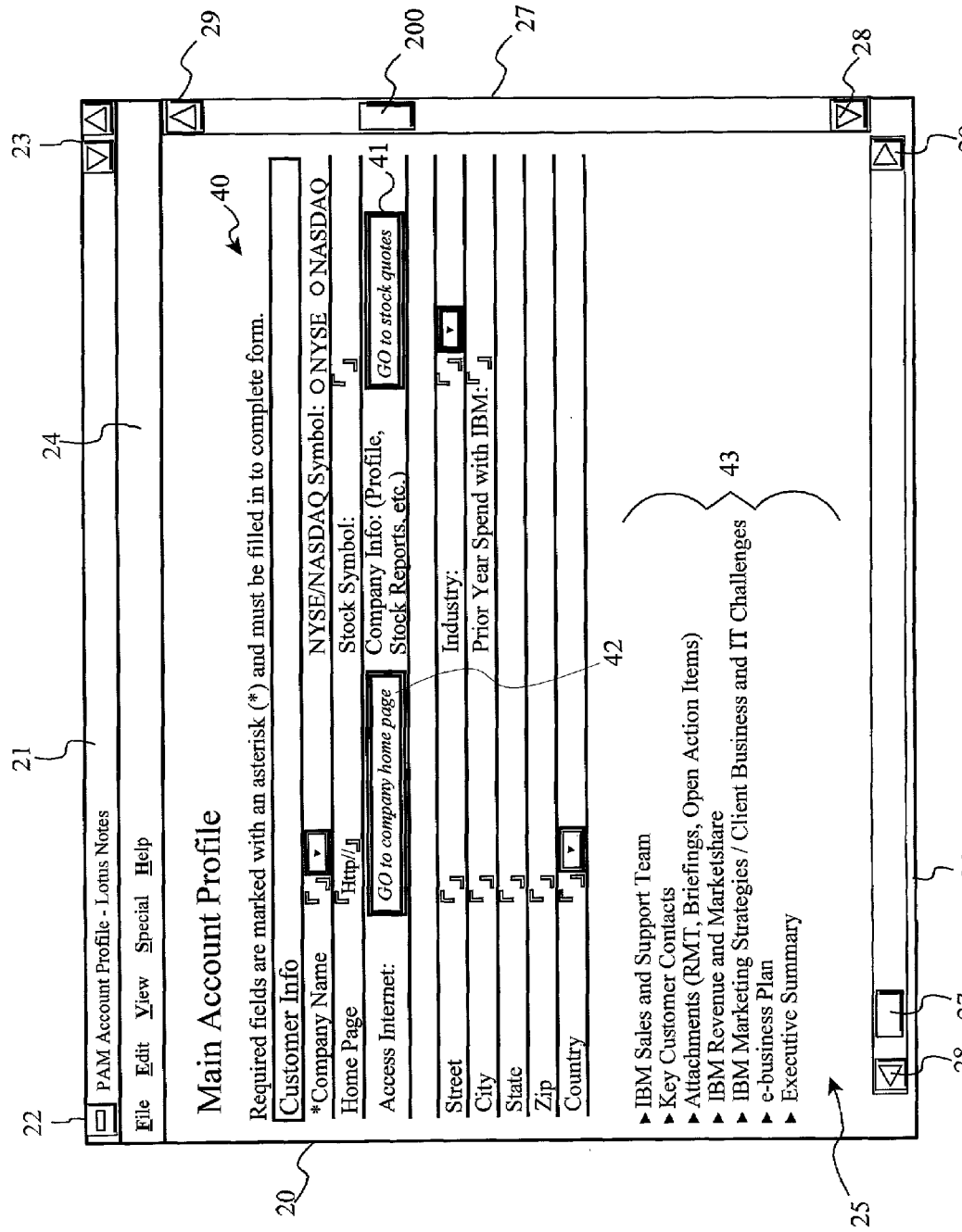
FIG. 4 shows the preferred embodiment of the main user interface screen, which provides access to a plurality of information and information types regarding a particular client account.

Turning to FIG. 4, the main screen for the Partnership Account Management system is shown. In this example, the display area (25) of a web browser frame (20) is used to display a database user interface screen, such as the main account profile screen (40). The web browser typically provides a banner area (21), which indicates the program which is currently running, such as the web browser and the Lotus Notes PAM application program. It also provides a command bar (24) which allows for file manipulation, editing of documents, changing of views and preferences, as well as other functions.

The web browser also provides the ability to manipulate the screen display through the use of buttons usually located in the upper right corner of the web browser screen (23) such as a close button, a multi-window view control button, and a minimize button. These functions are common to most web browsers and are available in the preferred embodiment in Netscape's Navigator software product.

The database server provides or transmits to the client computer an HTML document and form, as shown in the displayed area (25) of FIG. 4. In the preferred embodiment, the main screen (40) provides some fundamental information about a particular client, such as the client's company name, the trading symbol and/or market exchange on which the client's stock is traded, and an address for client's home page on the Internet. It further provides a button for activating a web browser and automatically pointing that web browser to the client's home page or to access a stock quote for the company's stock or for the client's stock. In the preferred embodiment, the hyperlink to the stock quote system is pointed to the Cable News Network Financial News ("CNNfn") web site, but this is an implementation choice and may be easily re-pointed to an alternate financial news server.

Additional information on the PAM main account screen (40) includes the client's street and/or mailing address, an industry classification for the client's line of business, and the country of domicile for the client. In the preferred embodiment, drop down lists are provided for both the industry and the country entries in the database in order to provide more consistent data contents of the records of the PAM database.

Additional expandable subforms (43) are provided on the PAM main account profile (40) which allow additional information to be accessed through the system. Subforms are areas of the display which can be selected by the user, such as clicking on the subform title, to expand the information shown under the subform title. In the preferred embodiment, expandable subforms are used to temporarily "hide" details under the subform titles until the user selects to see that information. In an alternate embodiment, standard hyperlinks could be used instead of expandable subforms.

These expandable subforms (43) display detailed information regarding the account's sales and support team, key contacts at the client, other attachments such as briefing documents and open action item documents, revenue and market share data, marketing strategy, business plans, and executive summary information.

Further according to the preferred embodiment, standard hyperlinks (36) can be used to access information from other networked servers.

Figure 5:
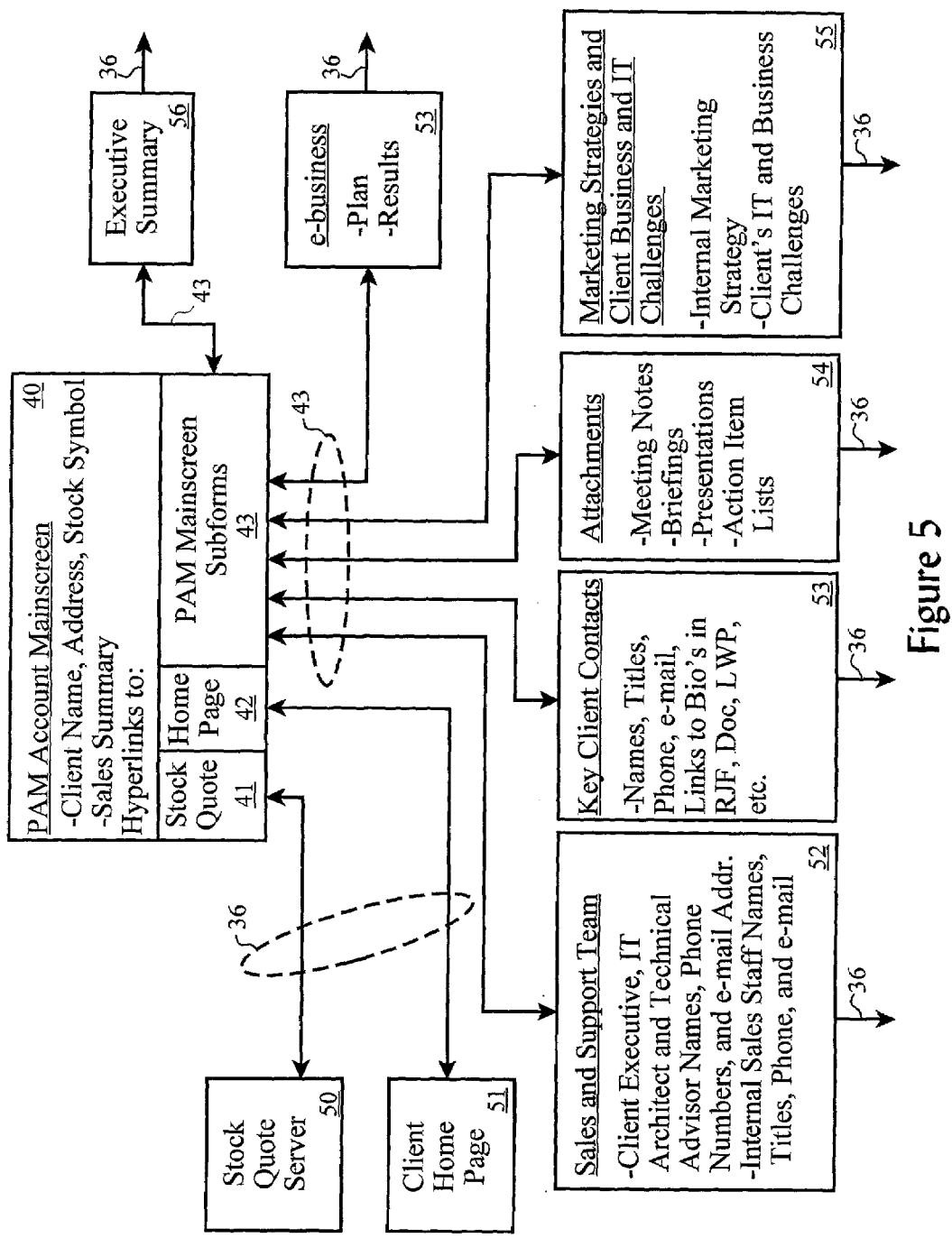
FIG. 5 illustrates the system architecture from the view of information organization and access.

Turning to FIG. 5, the information provided from the expandable subforms (43) and hyperlinks (36) on the PAM main account screen (40) is shown in more detail. The stock quote hyperlink (41) automatically submits a query to a stock quote server (50), such as Cable News Network's Financial Network ("CNNfn") server, to retrieve current and historical stock performance data. The home page hyperlink (42) automatically instantiates a web browser to display the client's home page (51).

An expandable subform (43) from the PAM main account screen (40) provides data on the company sales and support team members for the client's account (52). This preferably includes data and information on the account executive, the information technology architects for the client's account, and the technical advisor for the client. Information such as the name, telephone number, and e-mail address is provided in these database fields. Additionally, according to the preferred embodiments, names, titles, telephone numbers, and e-mail addresses for an extended support team related to the client's account are provided in this screen. Additional hyperlinks (36) from the subform may be provided to other related information network servers, or to e-mail addresses.

Another expandable subform (43) from the PAM main account screen (40) provides information regarding key client contacts and personnel at the client's company (53). This preferably includes the name, title, phone number, and e-mail addresses for each client contact, with whom the executive team members may need contact or with whom previous discussion may have been held. Preferably, this information is stored simply as data in fields of database records in the PAM database. Additional hyperlinks (36) may be provided on this subform to other related information, as well.

Further, according to the preferred embodiment, expandable subforms (43) are provided from the PAM main account screen (40) to documents including biographical information about the client's key contacts, such as hyperlinks (36) to word processor documents or web documents. Optionally, the ability of Lotus Notes databases to include RTF data in a database field may be used in this role to store key contact biographical information.

Also according to the preferred embodiment, the PAM main account screen (40) is provided with an expandable subform (43) to a group of attachments (54) which may include meeting notes, briefing packages for previous meetings, past presentations made to the client, and action item lists and tracking information. Again, the strengths of the Lotus Notes database as the platform for implementation of the invention are leveraged in that the attachments may be hyperlinked as word processor files, presentation files, or RTF stored directly in database fields. As such, a user may simply click or select a hyperlink which will cause the registered application program (word processor, presentation software, spreadsheet program, etc.) to be instantiated and activated to automatically open the related document.

Another expandable subform (43) preferably provided on the PAM main account screen (40) displays detailed marketing strategy and client business plan information (55). Again, as in the case of the attachments, this information may simply be hyperlinked (36) documents of a wide variety, or may be directly stored data in the database fields.

Two other expandable subforms (43) from the PAM main account screen (40) preferably display an executive summary (56) and an e-business plan and result (57). In the preferred embodiment, these are RTF fields in the database record, but could alternatively be hyperlinks (36) to other documents.

It will be recognized by those skilled in the art that certain variations and optional implementations from the disclosed preferred embodiment may be made without departing from the spirit and scope of the invention. Thus, it is intended that this description is for purposes of illustration only and should not be construed in a limiting sense. The scope of this invention should be defined by the following claims.

What is claimed is:

1. A method for organizing briefing packages for presentation to a sales account executive regarding client business entities managed by said sales account executive, said method comprising the steps of:

storing a plurality of client records relating to one or more client business entities, each client record containing a plurality of fields in at least one client account database, at least one of said fields containing a link to data, documents or information external to said database;

parsing a portion of an electronic mail message according to a predetermined format to determine a client record to which the message is to be linked;

integrating information to form a briefing package by linking said electronic mail message and at least one other external data item to at least one client record, said other external data item being selected from the list of a stock share price quote server, a business plan document, a marketing strategy document, a note from a previous meeting with said client, a previously presented presentation document and an action item list;

subsequently showing a first set of information for a selected client account on a main screen view on a user display by selecting a client record associated with a specific client business entity; and providing in said first set of shown information one or more user-selectable expandable subforms, wherein at least one subform retrieves and shows at least one of said linked external data items when expanded.

2. The method as set forth in claim 1 wherein said step of parsing a portion of said electronic mail message according to a predetermined format comprises parsing a subject field for a client name indicator.

3. The method as set forth in claim 1 wherein said step of showing a first set of information comprises showing a stock share trading symbol for a selected client account.

4. The method as set forth in claim 1 wherein said step of providing comprises providing at least one hyperlink to a word processor document.

5. The method as set forth in claim 1 wherein said step of providing comprises providing at least one hyperlink to a computer-readable presentation file.

6. The method as set forth in claim 1 wherein said step of providing comprises providing at least one hyperlink to an action item list.

7. The method as set forth in claim 1 wherein said step of providing comprises providing at least one hyperlink to a biographical account of an employee for a selected client account.

* * * * *